(12) United States Patent
Hanson

(10) Patent No.: X9453
(45) Date of Patent: Mar. 2, 1836

(54) CHURN

(76) Inventor: Amos Hanson

Amos Hanson Windham Maine

Letters Patent

The Schedule referred to in these Letters Patent and making part of the same con-
-taining a description in the words of the said Amos Hanson himself of his improve-
-ment in the butter Churn, To all to whom these presents shall come Be it known that I Amos Han-
-son of Windham County of Cumberland, State of Maine have invented a new
and important Machine for the [illegible] of butter and that the following
is a full and just description thereof. Two boards 2 feet 9 inches long or high 19
inches wide these boards are placed 13 inches apart with a circular groove
upon the inside of the above described boards so as to receive a bed in the same
Said circular bed is confined in the groove above described by three boards placed
at equal distances on the outside of each of said boards or side pieces and confined
by three rods in each end of the machine passing through from bar to bar ones [illegible]
[illegible] passing through the centre of the middle bar with four ladle boards attached
[illegible] [illegible] play within said circular groove on the end of the aforesaid [illegible]
is attached a pinion of four inches in diameter at the end of said middle bars
passes a shaft with a cog wheel in one end of sixteen in diameter for the purpose
of [illegible] into the above described pinion upon the side of said cog wheel is
placed another wooden wheel of two feet ten inches in diameter near the [illegible]
circumference of said wooden wheel are placed five pins for the purpose of operating
said machine.

What I claim as my own invention and not previously known in the
above described machine is the gearing that is attached and that operate said
Machine A. B. Said Machine has a cover at the top with a hole in the
centre for the purpose of admitting air

Amos Hanson

Cop'd
N.G.

Witnesses
Isaac Robinson
Eben Robinson